US011567683B2

(12) United States Patent
Bernat et al.

(10) Patent No.: US 11,567,683 B2
(45) Date of Patent: Jan. 31, 2023

(54) TECHNOLOGIES FOR PROVIDING EDGE DEDUPLICATION

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Timothy Verrall, Pleasant Hill, CA (US); Ned Smith, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/368,152

(22) Filed: Mar. 28, 2019

(65) Prior Publication Data

US 2019/0220210 A1  Jul. 18, 2019

(51) Int. Cl.
*G06F 3/06* (2006.01)
*G06F 12/02* (2006.01)
*G06F 16/901* (2019.01)
*G06F 12/1072* (2016.01)
*G06F 17/17* (2006.01)

(52) U.S. Cl.
CPC ............ *G06F 3/0641* (2013.01); *G06F 3/067* (2013.01); *G06F 3/0608* (2013.01); *G06F 12/0292* (2013.01); *G06F 12/1072* (2013.01); *G06F 16/9014* (2019.01); *G06F 17/17* (2013.01)

(58) Field of Classification Search
CPC ... G06F 3/0641; G06F 3/0608; G06F 12/0292
See application file for complete search history.

(56) References Cited

U.S. PATENT DOCUMENTS

| | | | | |
|---|---|---|---|---|
| 9,268,784 | B1* | 2/2016 | Guo | G06F 3/0671 |
| 9,467,704 | B2* | 10/2016 | Ten | H04N 19/184 |
| 2015/0088816 | A1* | 3/2015 | Kruglick | H04L 47/283 |
| | | | | 707/610 |
| 2018/0032261 | A1* | 2/2018 | Singhai | G06F 12/023 |
| 2019/0026043 | A1* | 1/2019 | Chen | G06F 16/174 |
| 2019/0121564 | A1* | 4/2019 | Guim Bernat | G06F 3/0608 |
| 2019/0278484 | A1* | 9/2019 | Tatsumi | G06F 12/0253 |
| 2020/0065017 | A1* | 2/2020 | Jiang | G06F 3/0658 |
| 2021/0337163 | A1* | 10/2021 | Diggins | H04N 11/20 |

* cited by examiner

*Primary Examiner* — Baboucarr Faal
(74) *Attorney, Agent, or Firm* — Hanley, Flight and Zimmerman, LLC (57) ABSTRACT

Technologies for providing deduplication of data in an edge network includes a compute device having circuitry to obtain a request to write a data set. The circuitry is also to apply, to the data set, an approximation function to produce an approximated data set. Additionally, the circuitry is to determine whether the approximated data set is already present in a shared memory and write, to a translation table and in response to a determination that the approximated data set is already present in the shared memory, an association between a local memory address and a location, in the shared memory, where the approximated data set is already present. Additionally, the circuitry is to increase a reference count associated with the location in the shared memory.

18 Claims, 7 Drawing Sheets

TECHNOLOGIES FOR PROVIDING EDGE DEDUPLICATION

BACKGROUND

An emerging paradigm in computing is edge computing, in which client compute devices (e.g., compute device(s) in a vehicle, etc.) located at an edge of a network (e.g., along a roadside) utilize memory and/or compute resources located at the edge (e.g., available at an edge location, such as a small cell, a base station, etc.) to provide lower latency services than would be possible if requests were routed to a cloud data center at the core of a network (e.g., at a central office). In operation, edge resources may receive vast amounts of data from the various client compute devices, such as sensor data (e.g., image data, audio data, temperature data, etc.), and relative to cloud data centers in which large amounts of resources are available to perform memory and compute operations, the resources at edge locations are comparatively limited. As such, it is possible for the edge resources to exhaust their memory capacity, potentially leading to reduced performance (e.g., as data is paged in and out of slower and higher capacity storage resources) and a reduction in any latency benefits that may have otherwise been obtained from performing the services at the edge rather than in a cloud data center located farther away from the client compute devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
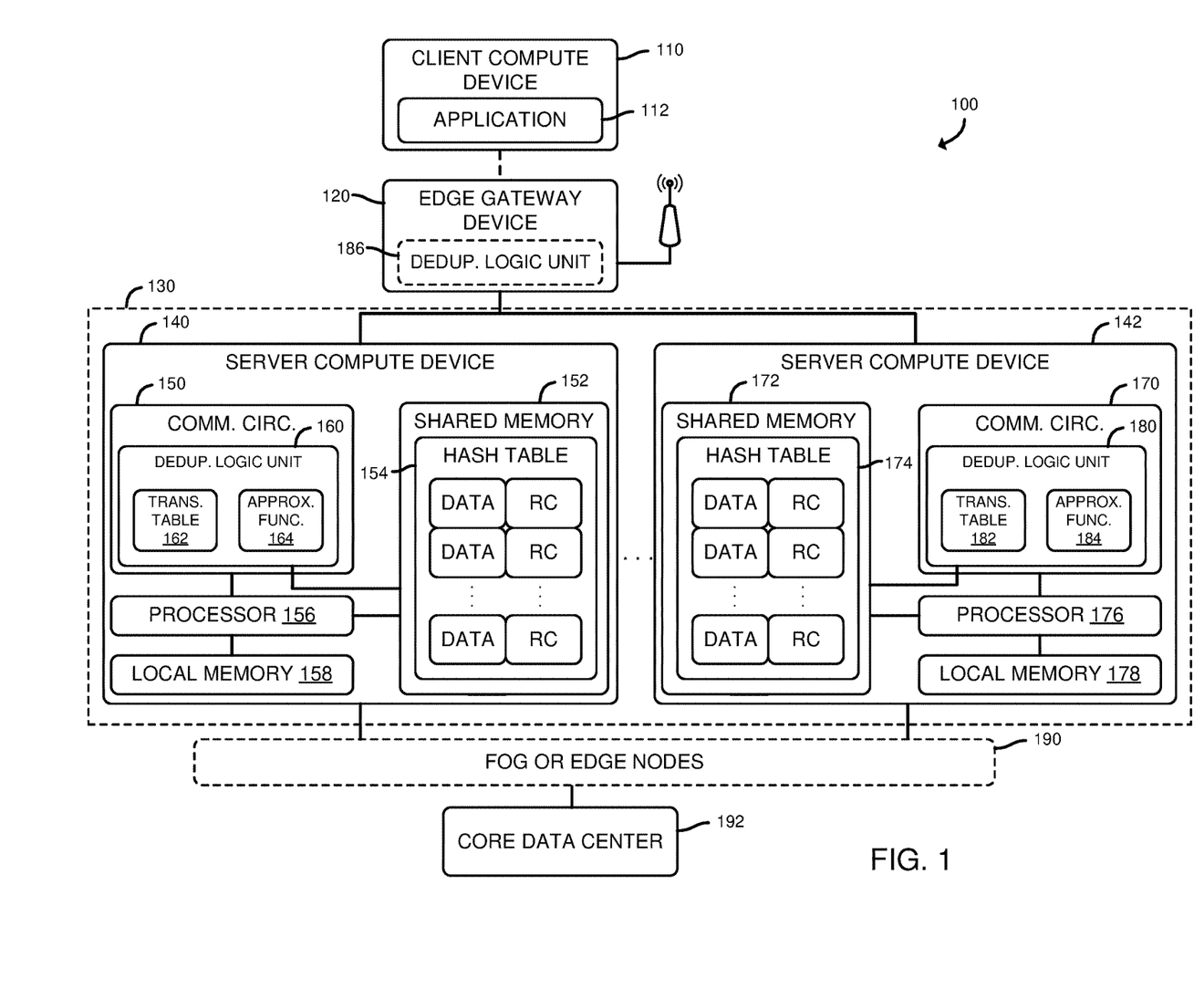
FIG. 1 is a simplified diagram of at least one embodiment of a system for providing deduplication of data in edge resources.

Referring now to FIG. 1, a system 100 for providing deduplication of data in edge resources includes a client compute device 110 in communication with an edge gateway device 120. The edge gateway device 120 may be embodied as any device capable of communicating data between the client compute device 110 and one or more edge resources 130 (e.g., server compute devices 140, 142), which may be owned and/or operated by one or more service providers, such as cellular network operators) or other compute devices located in a cloud. The edge gateway device 120 and the edge resources 130, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 190), which may be embodied as a system-level horizontal architecture that distributes resources and services of computing, storage, control and networking anywhere between a core data center 192 (e.g., a data center that is further away from and in a higher level of a hierarchy of the system 100 than the edge resources 130, and that includes multiple compute devices capable of executing one or more services (e.g., processes on behalf of one or more clients)) and an endpoint device (e.g., the client compute device 110).

As discussed in more detail herein, in the illustrative embodiment, the edge resources 130, which may include multiple server compute devices 140, 142, selectively perform deduplication of data associated with (e.g., provided by, accessed by, etc.) client compute devices (e.g., data produced or utilized by an application 112 executed by the client compute device 110). The server compute device 140 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). The server compute device 140 includes a deduplication logic unit 160, which may be embodied as any device or circuitry (e.g., a processor, a co-processor, reconfigurable circuitry, a field programmable gate array (FPGA), an application specific integrated circuit (ASIC), or virtualized version thereof, etc.) configured to selectively determine whether a given data set is equivalent to another data set that is already present in a shared memory 152, 172 (e.g., a memory accessible to the server compute device 140 and to one or more edge resources, such as the server compute device 142) and, if so, store, in a translation table 162 (e.g., a data set that associates local memory addresses, such as system memory addresses, with addresses in shared memory), a reference (e.g., a pointer) to a location of the existing data set in the shared memory 152, 172 rather than writing a duplicate copy to a new location in the shared memory 152, 172. In doing so, the deduplication logic unit 160 may apply an approximation function 164, which may be embodied as any function that operates on the data set to convert it to an approximated data set (e.g., a data set that is different but treated as being equivalent to the original data set), such as by reducing the precision of data values in the data set, adjusting one or more values to match a set of predefined values (e.g., converting colors to a predefined color palette), etc. As such, for instances of data that vary only slightly from each other (e.g., within a predefined numeric distance of other instances of the data, such as temperature readings that vary by 0.1 degrees), each instance of the data is treated as being exactly the same, for deduplication purposes, thereby reducing the number of unique instances of the data to be retained in memory (e.g., the shared memory 152, 172). In the illustrative embodiment, the shared memory 152 includes a hash table 154, which may be embodied as any data structure that associates unique data sets with reference counts (e.g., a numeric value indicative of the number of pointers (e.g., in a translation table 162) that reference that unique data set). Further, in the illustrative embodiment, the system 100 utilizes distributed hash tables (e.g., spread across multiple sets of shared memory 152, 172) in which updates to one hash table 154 may be propagated to other hash tables (e.g., the hash table 174). Additionally, and a described in more detail herein, the deduplication logic unit 160 may determine not to apply deduplication for some types of data (e.g., based on a priority, type, or importance of the data, etc.) and instead cause the data to be retained in a local memory 158, which may be of a different underlying type (e.g., faster, lower capacity) than the shared memory 152. The deduplication logic unit 160, in the illustrative embodiment, is included in communication circuitry 150, rather than in a general purpose processor 156, to enable more efficient access to deduplicated data (e.g., to provide a more direct path for a data access request received by the communication circuitry 150 to the shared memory 152). The server compute device 142, in the illustrative embodiment, includes a deduplication logic unit 180, a translation table 182, an approximation function 184, a processor 176, a local memory 178, and a shared memory 172 similar to those of the server compute device 140. In some embodiments, the edge gateway device 120 may include a deduplication logic unit 186, similar to the deduplication logic unit 160, and perform one or more of the deduplication functions that are described herein as being performed by the server compute devices 140, 142.

Figure 2:
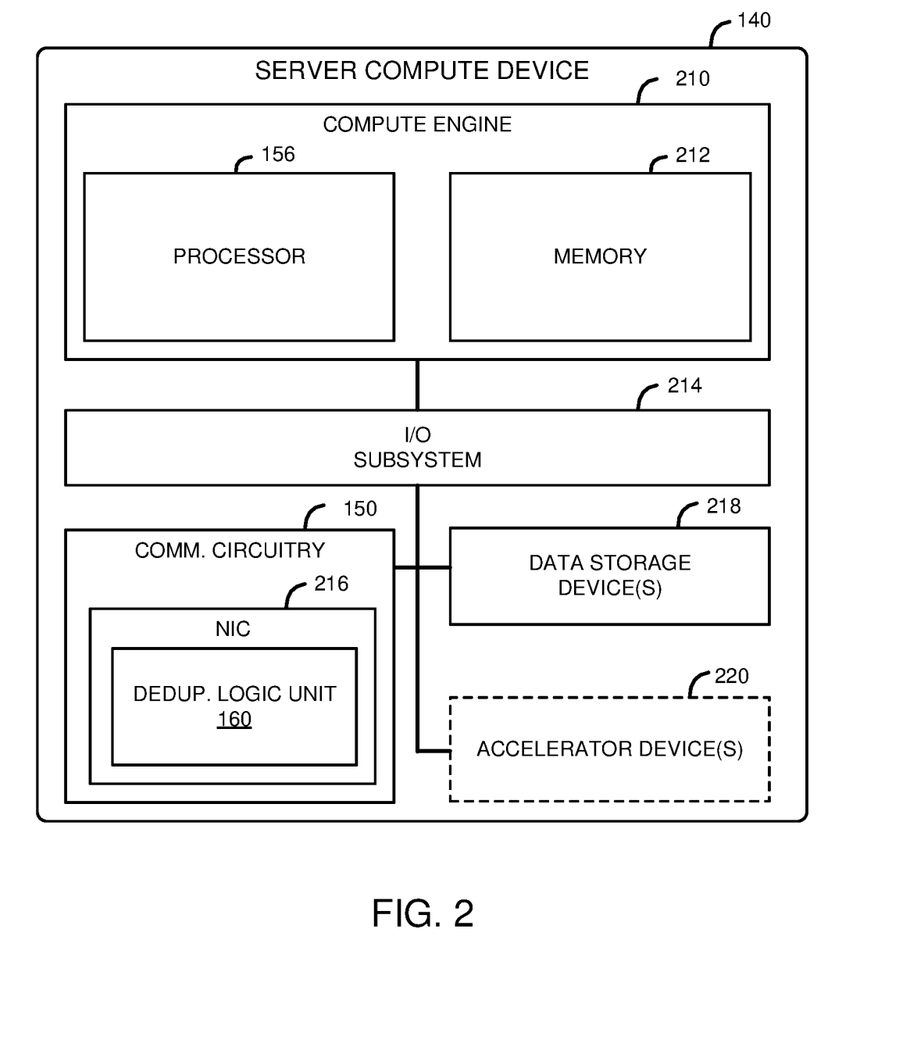
FIG. 2 is a simplified block diagram of at least one embodiment of a server compute device included in the system of FIG. 1.

Referring now to FIG. 2, the illustrative server compute device 140 includes a compute engine (also referred to herein as "compute engine circuitry") 210, an input/output (I/O) subsystem 214, communication circuitry 150, and one or more data storage devices 218. As described herein, the server compute device 140 may also include one or more accelerator devices 220. Of course, in other embodiments, the client compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as the processor 156 and a memory 212 (e.g., similar to the memories 152, 158 of FIG. 1). The processor 156 may be embodied as any type of processor capable of performing the functions described herein (e.g., executing the application 112). For example, the processor 156 may be embodied as a multi-core processor(s), a microcontroller, or other processor or processing/controlling circuit. In some embodiments, the processor 156 may be embodied as, include, or be coupled to an FPGA, an application specific integrated circuit (ASIC), reconfigurable hardware or hardware circuitry, or other specialized hardware to facilitate performance of the functions described herein.

The main memory 212 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 212 may be integrated into the processor 156. In the illustrative embodiment, the memory 212 includes the local memory 158, which may be of one type (e.g., DRAM) and the shared memory 152, which may be of another type (e.g., memory having a cross point architecture). The main memory 212 may store various software and data used during operation such as one or more applications (the application 112), data operated on by the application(s), libraries, and drivers.

The compute engine 210 is communicatively coupled to other components of the server compute device 140 via the I/O subsystem 214, which may be embodied as circuitry and/or components to facilitate input/output operations with the compute engine 210 (e.g., with the processor 156 and/or the main memory 212) and other components of the server compute device 140. For example, the I/O subsystem 214 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 214 may form a portion of a system-on-a-chip (SoC) and be incorporated, along with one or more of the processor 156, the main memory 212, and other components of the server compute device 140, into the compute engine 210.

The communication circuitry 150 may be embodied as any communication circuit, device, or collection thereof, capable of enabling communications over a network between the server compute device 140 and another compute device (e.g., the edge gateway device 120, the client compute device 110, the server compute device 142, etc.). The communication circuitry 150 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 150 includes a network interface controller (NIC) 216, which may also be referred to as a host fabric interface (HFI). The NIC 216 may be embodied as one or more add-in-boards, daughter cards, network interface cards, controller chips, chipsets, or other devices that may be used by the server compute device 140 to connect with another compute device (e.g., the edge gateway device 120, the client compute device 110, the server compute device 142, etc.). In some embodiments, the NIC 216 may be embodied as part of a system-on-a-chip (SoC) that includes one or more processors, or included on a multichip package that also contains one or more processors. In some embodiments, the NIC 216 may include a local processor (not shown) and/or a local memory (not shown) that are both local to the NIC 216. In such embodiments, the local processor of the NIC 216 may be capable of performing one or more of the functions of the compute engine 210 described herein. Additionally or alternatively, in such embodiments, the local memory of the NIC 216 may be integrated into one or more components of the server compute device 140 at the board level, socket level, chip level, and/or other levels. In the illustrative embodiment, the NIC 216 includes the deduplication logic unit 160 described above with reference to FIG. 1.

The one or more illustrative data storage devices 218 may be embodied as any type of devices configured for short-term or long-term storage of data such as, for example, memory devices and circuits, memory cards, hard disk drives, solid-state drives, or other data storage devices. Each data storage device 218 may include a system partition that stores data and firmware code for the data storage device 218. Each data storage device 218 may also include one or more operating system partitions that store data files and executables for operating systems.

Each accelerator device(s) 220 may be embodied as any device(s) or circuitries configured to execute a set of operations faster than the processor 156 is capable of executing the operations. The accelerator device(s) 220 may include one or more field programmable gate arrays (FPGAs), each of which may be embodied as a set (e.g., a matrix) of logic gates that can be configured to perform a set of operations according to a defined configuration (e.g., a bit stream). The accelerator device(s) 220 may additionally or alternatively include an artificial intelligence accelerator, which may be embodied as which may be embodied as any device or circuitry (e.g., a programmable logic chip, a processor, etc.) configured to perform artificial intelligence related operations (e.g., matrix multiplication, vector operations, machine learning training operations, machine learning inference operations, etc.). Additionally or alternatively, the accelerator device(s) 220 may include a cryptography accelerator, which may be embodied as any device or circuitry (e.g., a programmable logic chip, a processor, etc.) configured to perform operations related to cryptographic operations (e.g., data encryption, data decryption, identity authentication, etc.). Additionally or alternatively the accelerator device(s) 220 may include other types of devices, such as one or more application specific integrated circuits (ASICs).

The server compute device 142, the edge gateway device 120, the fog nodes 190, the core data center 192, and the client compute device 110 may have components similar to those described in FIG. 2 with reference to the server compute device 140. The description of those components of the server compute device 140 is equally applicable to the description of components of the server compute device 142, the edge gateway device 120, the fog nodes 190, the core data center 192, and the client compute device 110. As stated above, in some embodiments, the edge gateway device 120 may perform one or more of the deduplication functions described herein and, as such, may include a deduplication logic unit 186, similar to the deduplication logic unit 160. Further, it should be appreciated that any of the server compute device 142, the edge gateway device 120, the fog nodes 190, the core data center 192, and the client compute device 110 may include other components, sub-components, and devices commonly found in a computing device, which are not discussed above in reference to the server compute device 140 and not discussed herein for clarity of the description. Further, it should be understood that one or more components of a compute device may be distributed across any distance, and are not necessarily housed in the same physical unit.

The client compute device 110, the edge gateway device 120, the server compute devices 140, 142, the fog nodes 190, and the core data center 192 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
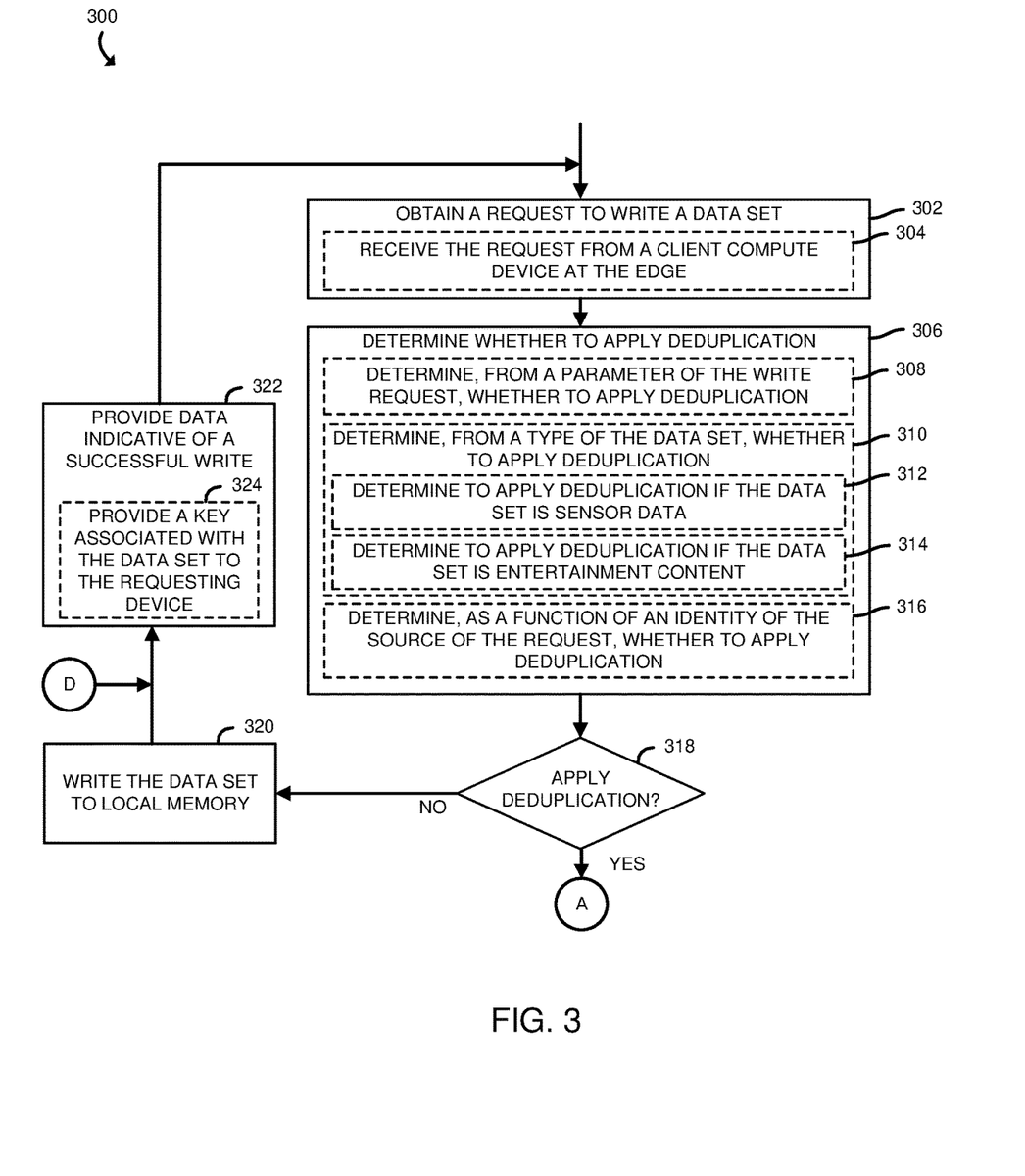
FIG. 3-5 are a simplified block diagram of at least one embodiment of a method for writing a data set that may be performed by a server compute device of FIG. 1.

Referring now to FIG. 3, the server compute device 140, in operation, may execute a method 300 for writing a data set and selectively utilizing deduplication to conserve memory resources (e.g., capacity in the shared memory 152, 172). The method 300 begins with block 302 in which the server compute device 140 obtains a request to write a data set. In doing so, and as indicated in block 304, the server compute device 140 may receive the request from a client compute device at the edge (e.g., from the client compute device 110). Subsequently, in block 306, the server compute device 140 determines whether to apply deduplication to the data set. In doing so, the server compute device 140 may determine, from a parameter of the write request, whether to apply deduplication, as indicated in block 308. For example, the write request may include a flag or other data (e.g., a numeric value indicating the priority of the data) indicative of an instruction to apply deduplication for the data set. Additionally or alternatively, the server compute device 140 may determine whether to apply deduplication based on the type of the data in the data set, as indicated in block 310. For example, and as indicated in block 312, the server compute device 140 may determine to apply deduplication if the data is sensor data (e.g., temperature data) or if the data is entertainment content (e.g., a graphics file for a character in a video game, etc.), as indicated in block 314. In some embodiments, the server compute device 140 may determine, as a function of the identity of the source of the write request (e.g., the source of the data set) whether to apply deduplication, as indicated in block 316. For example, the server compute device 140 may reference a rule (e.g., from a configuration file) that indicates that data sets from a particular source (e.g., a particular Internet Protocol (IP) address) should be deduplicated, as the data sets from that source are typically of low priority and/or are highly redundant. In some embodiments, the decision of whether to apply deduplication may be based on data received from another edge gateway device (not shown), such as at another edge location (e.g., base station). For example, the client compute device 110 may be a mobile entity roaming between edge gateway devices 120 (e.g., between edge locations, such as base stations). When an edge gateway device at the subsequent edge location (e.g., subsequent base station) determines that the client compute device 110 is fully connected to the subsequent edge location and no longer is connected to the previous edge location, the subsequent edge gateway device may send a notification to the edge gateway device 120 to apply deduplication. Further, in some embodiments, the client compute device 110 may predict the subsequent edge location (e.g., based on a location and direction of movement of the client compute device 110) and send a notification to the subsequent edge location (e.g., to an edge gateway device) that deduplication may need to be performed at that subsequent edge location. Data (e.g., notifications) may be communicated between edge locations over a backhaul network common to the fog nodes 190 of FIG. 1.

In block 318, the server compute device 140 determines the subsequent course of action as a function of whether deduplication is to be applied (e.g., as determined in block 306). If the server compute device 140 has determined not to apply deduplication, the method 300 advances to block 320, in which the server compute device 140 writes the data set to local memory (e.g., to the local memory 158). Subsequently, the method 300 advances to block 322 in which the server compute device 140 may provide data indicative of a successful write operation. For example, and as indicated in block 324, the server compute device 140 may provide (e.g., send) a key associated with the data set to the requesting device (e.g., the device that originally produced the write request, such as the client compute device 110).

The key may be embodied as any data usable to uniquely identify the data set that was stored (e.g., to enable the client compute device 110 to request that data set in the future). Afterwards, the method 300, in the illustrative embodiment, loops back to block 302 to potentially receive obtain another write request. Referring back to block 318, if the server compute device 140 instead determined to apply deduplication, the method 300 advances to block 326 of FIG. 4, in which, in the illustrative embodiment, the server compute device 140 applies an approximation function to the data set. As described above, the approximation function may be embodied as any function that operates on the data set to convert it to an approximated data set (e.g., a data set that is different but treated as being equivalent to the original data set), such as by reducing the precision of data values in the data set, adjusting one or more values to a set predefined values (e.g., converting colors to a predefined color palette), etc.

Figure 4:
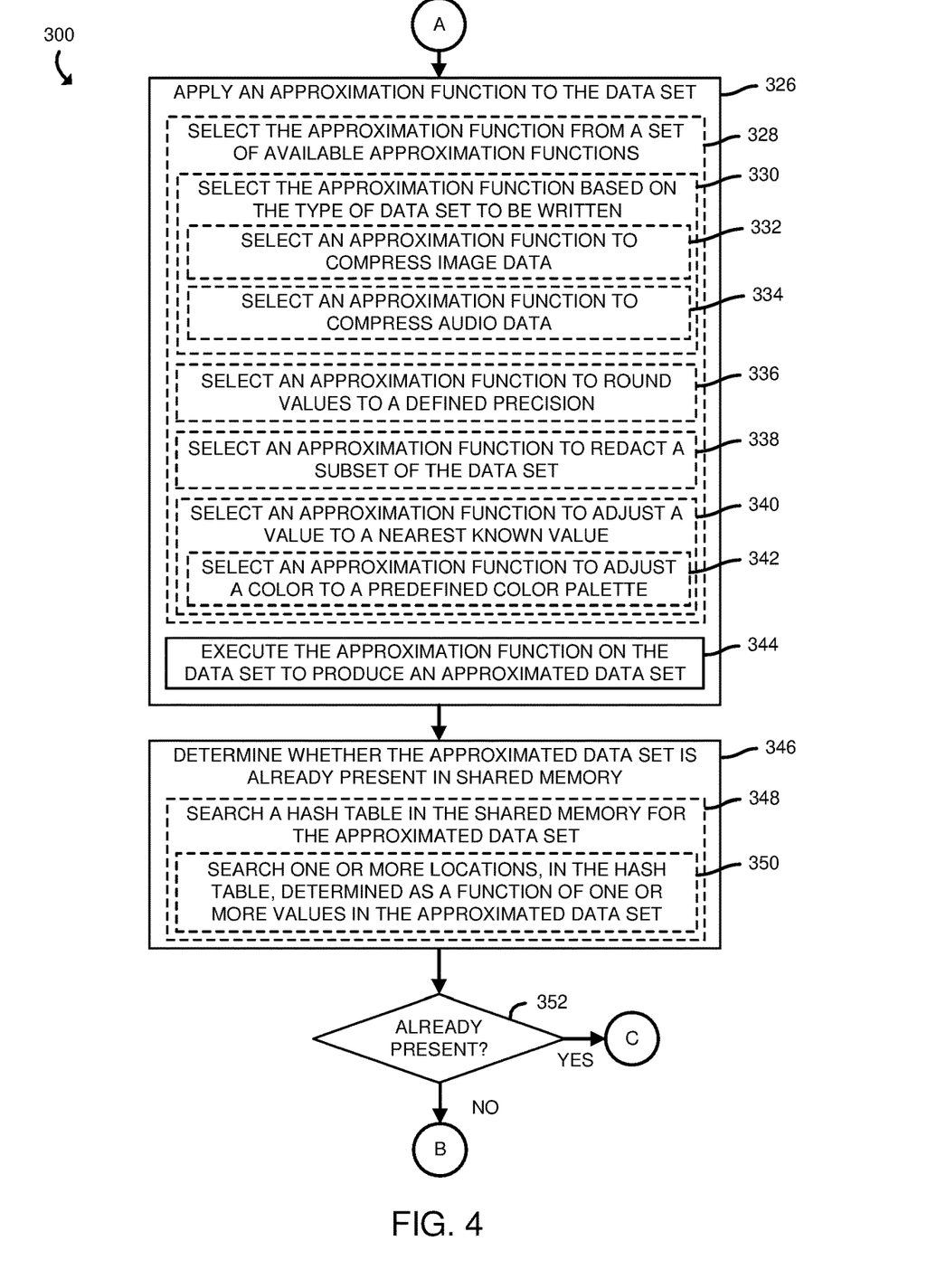

Referring now to FIG. 4, in applying the approximation function to the data set, the server compute device 140 may select the approximation function from a set of available approximation functions (e.g., multiple approximation functions defined (e.g., registered) in the deduplication logic unit 160), as indicated in block 328. The server compute device 140 may select the approximation function based on the type of data set to be written, as indicated in block 330. For example, and as indicated in block 332, if the data set is image data, the server compute device 140 may select an approximation function that compresses image data. As another example, and as indicated in block 334, the server compute device 140 may select an approximation function that compresses audio data (e.g., if the data set is audio data). As indicated in block 336, the server compute device 140 may select an approximation function to round one or more values to obtain a predefined precision (e.g., rounding a decimal number to an integer). Similarly, as indicated in block 338, the server compute device 140 may select an approximation function to redact (e.g., remove) a subset of the data set (e.g., by removing data representative of frequencies outside of a predefined frequency band, removing metadata, etc.). As indicated in block 340, the server compute device 140 may select an approximation function to adjust a value present in the data set to a nearest known (e.g., predefined) value. For example, and as indicated in block 342, the server compute device 140 may select an approximation function to adjust a color represented in the data set to a similar color (e.g., within a predefined numeric distance of a reference color) in a predefined color palette (e.g., by converting a pixel value representative of a blue-green color to blue). In some embodiments, the server compute device 140 may select an approximation function that involves data expiration. For example, the approximation function may count a time to live or time/date threshold value for which data is retained until the approximation function determines that the expiration condition has been met. In some embodiments, the data expiration approximation function may be combined with another approximation function (e.g., an approximation function described above) to form a composite approximation function. As indicated in block 344, the server compute device 140 executes the approximation function on the data set to produce an approximated data set (e.g., an output data set).

Subsequently, in block 346, the server compute device 140 determines whether the approximated data set is already present in the shared memory 152, 172. In doing so, the server compute device 140 may search a hash table in the shared memory (e.g., the hash tables 154, 174 of the shared memories 152, 172) for the approximated data set, as indicated in block 348. Further, and as indicated in block 350, the server compute device 140 may search one or more locations, in the hash table, that are determined as a function of one or more values in the approximated data set. That is, a portion of the content of the approximated data set may define or determine, at least in part, the location (e.g., address) within a hash table 154, 174 to be checked for the presence of the approximated data set. In block 352, the server compute device 140 determines the subsequent course of action based on whether the approximated data set was determined to be already present in a shared memory 152, 172. If not, the method 300 advances to block 354 of FIG. 5, in which the server compute device 140 writes the approximated data set to the shared memory (e.g., the shared memory 152 or the shared memory 172).

Figure 5:
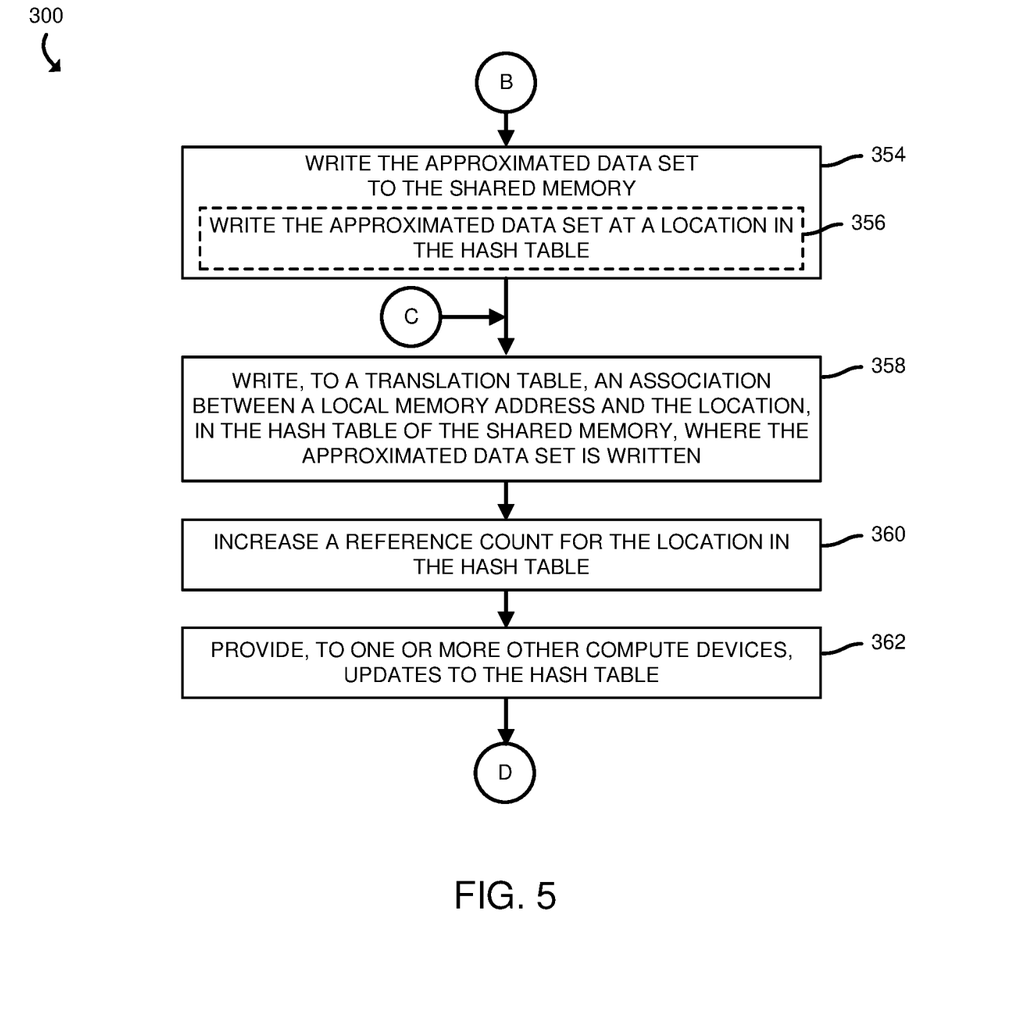

Referring now to FIG. 5, in writing the approximated data set to the shared memory, the server compute device 140, in the illustrative embodiment, writes the approximated data set at a location in the hash table of the shared memory (e.g., the hash table 154 of the shared memory 152), as indicated in block 356. Subsequently, or if the server compute device 140 determined that the approximated data set was already in the shared memory (e.g., in block 346), the method 300 advances to block 358 in which the server compute device 140 writes, to a translation table (e.g., the translation table 162) an association between a local memory address and the location in the hash table where the approximated data set is written. In other words, the server compute device 140 writes redirection information that redirects accesses to a particular memory address for the local memory 158 to an address (e.g., a location) in the shared memory (e.g., the shared memory 152 or the shared memory 172), where the approximated data set is located.

Additionally, in block 360, the server compute device 140 increases a reference count for the location in the shared memory (e.g., in the hash table) associated with the approximated data set. For example, if the approximated data set did not already exist in the shared memory, then the server compute device 140 would increase the reference count from zero to one, to indicate that one local memory address is redirected to the location in shared memory where the approximated data set is stored. Otherwise (e.g., if the approximated data set was already present in the shared memory), the server compute device 140 increases the reference count (e.g., from one to two) to indicate that another local memory address redirects to the location associated with the approximated data set. It should be understood that when the approximated data set is to be deleted (e.g., based on a delete request that specifies a corresponding local memory address), the reference count is decremented and the underlying approximated data set is only deleted if the reference count is reduced from one to zero and the approximated data set has not been designated as being protected for archival purposes. In block 362, the server compute device 140 may provide, to one or more other compute devices (e.g., the server compute device 142) updates to the hash table (e.g., information indicating that the approximated data set was written and/or an update to the reference count associated with the approximated data set). Subsequently, the method 300 loops back to block 302 of FIG. 3, in which the server compute device 140 may obtain another write request.

Figure 6:
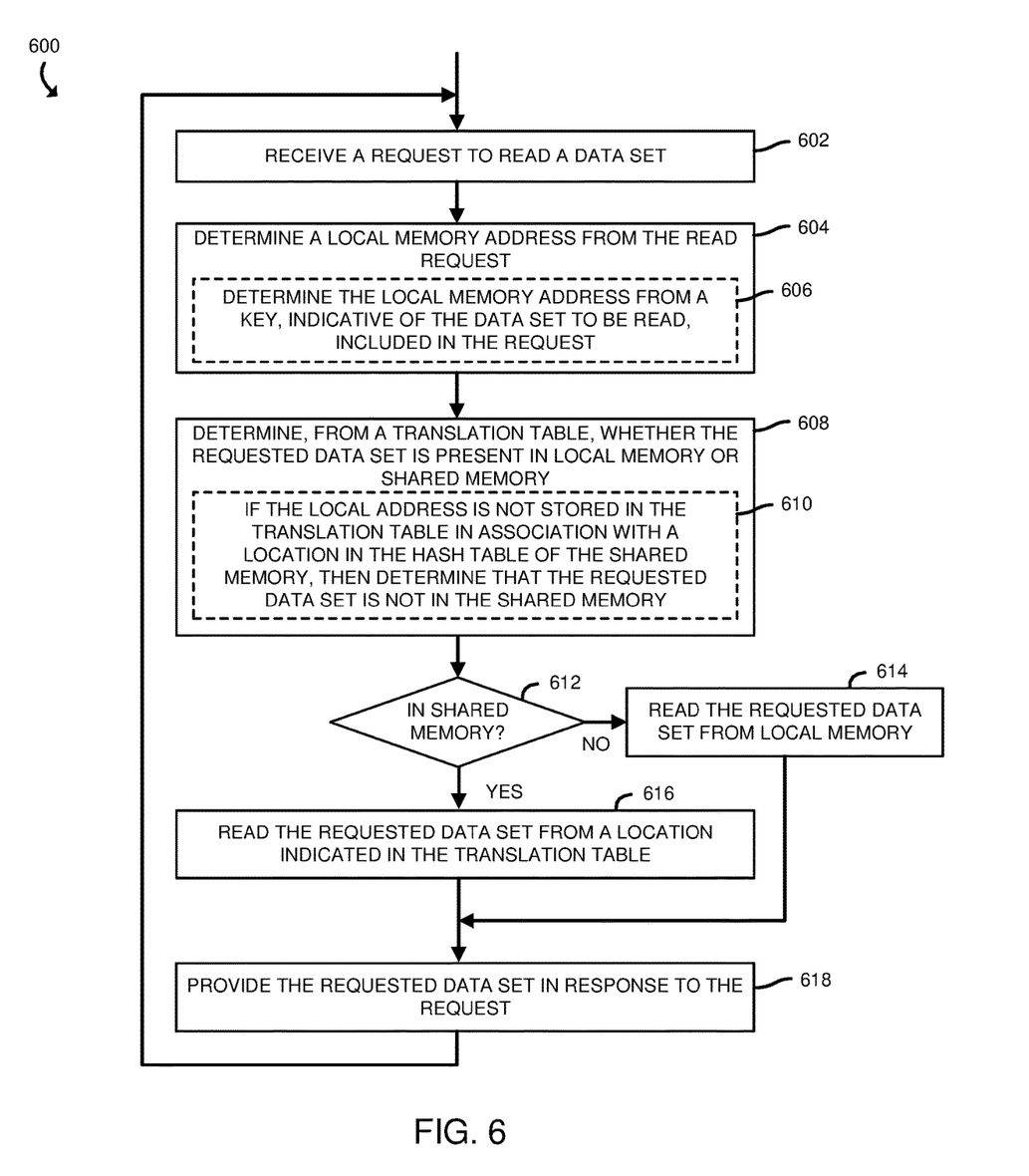
FIG. 6 is a simplified block diagram of at least one embodiment of a method for reading a data set that may be performed by a server compute device of FIG. 1.

Referring now to FIG. 6, the server compute device 140, in operation, may execute a method 600 for reading a data set, taking into account the deduplication scheme described herein. The method 600 begins with block 602, in which the server compute device 140 receives a request to read a data set (e.g., a request from the client compute device 110). Subsequently, in block 604, the server compute device 140 determines, from the read request, a local memory address. In doing so, and as indicated in block 606, the server compute device 140 may determine the local memory address from a key included in the request. The key may be embodied as any that identifies the data set to be read (e.g., the local memory address itself, a unique identifier that is associated, in a table of keys and associated local memory addresses, with the local memory address, etc.). Subsequently, and as indicated in block 608, the server compute device 140 determines, from a translation table (e.g., the translation table 162), whether the requested data set is present in local memory 158 or in shared memory 152, 172. In doing so, and as indicated in block 610, the server compute device 140 determines that the requested data set is not in the shared memory 152, 172 (e.g., the requested data set is instead in the local memory 158) if the local address is not stored (e.g., not present) in the translation table 162 in association with a location in the hash table 154, 174 of the shared memory 152, 172.

In block 612, the server compute device 140 determines the subsequent course of action based on whether the requested data set was determined to be in the shared memory 152, 172. If the requested data set is not in the shared memory 152, 172, the method 600 advances to block 614, in which the server compute device 140 reads the requested data set from local memory 158 (e.g., using the local memory address from block 604). Otherwise, the server compute device 140 reads the requested data set from the location indicated in the translation table 162 (e.g., the location associated with the local memory address, described above with reference to blocks 608, 610), as indicated in block 616. Once the data set is read (e.g., from local memory 158 or from shared memory 152, 172), the method 600 advances to block 618 in which the server compute device 140 provides the requested data set (e.g., to the client compute device 110 or other device that produced the read request) in response to the request. For example, the server compute device 140 may send the requested data set to the client compute device 110 via the edge gateway device 120. Subsequently, the method 600 loops back to block 602 to await another read request.

Figure 7:
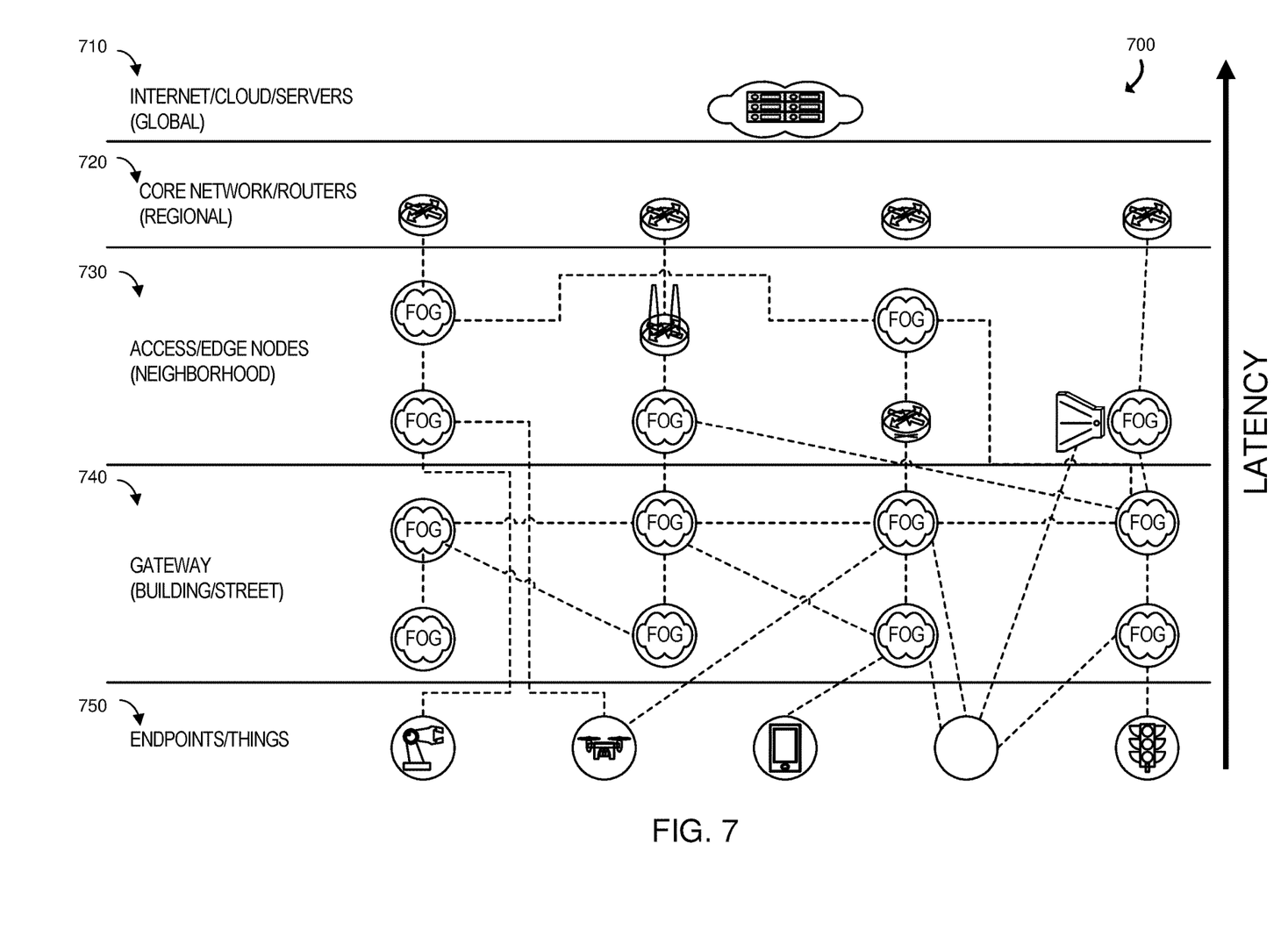
FIG. 7 is a simplified block diagram of a fog and mobile edge computing (MEC) network topology that may be utilized with the system of FIG. 1.

Referring briefly to FIG. 7, a MEC and fog network topology 700 is shown. The network topology 700 includes endpoints (at an endpoints/things network layer 750), gateways (at a gateway layer 740), access or edge computing nodes (e.g., at neighborhood nodes layer 730), core network or routers (e.g., at a regional or central office layer 720), and internet/cloud servers at a global layer 710. A fog network (e.g., established at the gateway layer 740) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 7 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a compute device comprising circuitry to obtain a request to write a data set; apply, to the data set, an approximation function to produce an approximated data set; determine whether the approximated data set is already present in a shared memory; write, to a translation table and in response to a determination that the approximated data set is already present in the shared memory, an association between a local memory address and a location, in the shared memory, where the approximated data set is already present; and increase a reference count associated with the location in the shared memory.

Example 2 includes the subject matter of Example 1, and wherein to obtain the request comprises to receive the request from a compute device located at the edge of a network.

Example 3 includes the subject matter of any of Examples 1 and 2, and wherein the circuitry is further to write, to the shared memory and in response to a determination that the approximated data set is not already present in the shared memory, the approximated data set.

Example 4 includes the subject matter of any of Examples 1-3, and wherein to apply the approximation function comprises to select the approximation function from a set of available approximation functions.

Example 5 includes the subject matter of any of Examples 1-4, and wherein to select the approximation function comprises to select the approximation function based on a type of the data set to be written.

Example 6 includes the subject matter of any of Examples 1-5, and wherein to select the approximation function comprises to select an approximation function to compress image data.

Example 7 includes the subject matter of any of Examples 1-6, and wherein to select the approximation function comprises to select an approximation function to compress audio data.

Example 8 includes the subject matter of any of Examples 1-7, and wherein to select the approximation function comprises to select an approximation function to round one or more values to a defined precision.

Example 9 includes the subject matter of any of Examples 1-8, and wherein to select the approximation function comprises to redact a subset of the data set.

Example 10 includes the subject matter of any of Examples 1-9, and wherein to select an approximation function comprises to select an approximation function to adjust a value to a nearest known value.

Example 11 includes the subject matter of any of Examples 1-10, and wherein to select the approximation function comprises to select an approximation function to adjust a color to a reference color in a predefined color palette.

Example 12 includes the subject matter of any of Examples 1-11, and wherein to determine whether the approximated data set is already present in a shared memory comprises to search a hash table in the shared memory for the approximated data set.

Example 13 includes the subject matter of any of Examples 1-12, and wherein the circuitry is further to determine whether to apply deduplication and wherein to apply the approximation function comprises to apply the approximation function in response to a determination to apply deduplication.

Example 14 includes the subject matter of any of Examples 1-13, and wherein to determine whether to apply deduplication comprises to determine, from a type of the data set, whether to apply deduplication.

Example 15 includes the subject matter of any of Examples 1-14, and wherein to determine whether to apply deduplication comprises to determine, from an identity of the source of the data set, whether to apply deduplication.

Example 16 includes a method comprising obtaining, by a device, a request to write a data set; applying, by the device and to the data set, an approximation function to produce an approximated data set; determining, by the device, whether the approximated data set is already present in a shared memory; writing, by the device and to a translation table and in response to a determination that the approximated data set is already present in the shared memory, an association between a local memory address and a location, in the shared memory, where the approximated data set is already present; and increasing, by the device, a reference count associated with the location in the shared memory.

Example 17 includes the subject matter of Example 16, and wherein obtaining the request comprises receiving the request from a compute device located at the edge of a network.

Example 18 includes the subject matter of any of Examples 16 and 17, and further including writing, by the device and to the shared memory, in response to a determination that the approximated data set is not already present in the shared memory, the approximated data set.

Example 19 includes one or more machine-readable storage media comprising a plurality of instructions stored thereon that, in response to being executed, cause a compute device to perform operations including obtaining a request to write a data set; applying, to the data set, an approximation function to produce an approximated data set; determining whether the approximated data set is already present in a shared memory; writing, to a translation table and in response to a determination that the approximated data set is already present in the shared memory, an association between a local memory address and a location, in the shared memory, where the approximated data set is already present; and increasing a reference count associated with the location in the shared memory.

Example 20 includes the subject matter of Example 19, and wherein the plurality of instructions further cause the compute device to perform the operations in a virtualized environment.

Example 21 includes one or more machine-readable storage media comprising a plurality of instructions stored thereon that, after being prepared for execution, cause a device that executes the prepared instructions to obtain a request to write a data set; apply, to the data set, an approximation function to produce an approximated data set; determine whether the approximated data set is already present in a shared memory; write, to a translation table and in response to a determination that the approximated data set is already present in the shared memory, an association between a local memory address and a location, in the shared memory, where the approximated data set is already present; and increase a reference count associated with the location in the shared memory.

What is claimed is:

1. A compute device comprising:
memory; and
circuitry to:
obtain a request to write input data;
select a function from a plurality of different types of functions based on at least one of a data type of the input data or a type of approximation to be applied to the input data;
apply the function to the input data to produce output data;
determine whether the output data is already present in a shared memory;
write, to a translation table after a determination that the output data is already present in the shared memory, an association between a local memory address and a location, in the shared memory, where the output data is already present; and
increase a reference count associated with the location in the shared memory.

2. The compute device of claim 1, wherein to obtain the request, the circuitry is to receive the request from a second compute device located at an edge of a network.

3. The compute device of claim 1, wherein the circuitry is further to write the output data to the shared memory when the output data is not already present in the shared memory.

4. The compute device of claim 1, wherein the data type of the input data is image data and the type of approximation to be applied to the input data is to compress the image data.

5. The compute device of claim 1, wherein the data type of the input data is audio data and the type of approximation to be applied to the input data is to compress the audio data.

6. The compute device of claim 1, wherein the type of approximation to be applied to the input data is to select the approximation function, the circuitry is to select the approximation function to round one or more values to a defined precision.

7. The compute device of claim 1, wherein the type of approximation to be applied to the input data is to redact a subset of the input data.

8. The compute device of claim 1, wherein the type of approximation to be applied to the input data is to adjust a value to a nearest known value.

9. The compute device of claim 1, wherein to select the function, the circuitry is to select the function to adjust a color to a reference color in a predefined color palette.

10. The compute device of claim 1, wherein to determine whether the output data is already present in the shared memory, the circuitry is to search a hash table in the shared memory for the output data.

11. The compute device of claim 1, wherein the circuitry is further to determine whether to apply deduplication, the circuitry to apply the function in response to a determination to apply the deduplication.

12. The compute device of claim 11, wherein to determine whether to apply the deduplication, the circuitry is to determine, from a type of the input data, whether to apply the deduplication.

13. The compute device of claim 11, wherein to determine whether to apply the deduplication, the circuitry is to determine, from an identity of a source of the input data, whether to apply the deduplication.

14. A method comprising:
    obtaining, by a device, a request to write input data;
    selecting, by the device, a function from a plurality of different types of functions based on at least one of a data type of the input data or a type of approximation to be applied to the input data;
    applying, by the device, the function to the input data to produce an output data;
    determining, by the device, whether the output data is already present in a shared memory;
    writing, by the device and to a translation table and in response to after a determination that the output data is already present in the shared memory, an association between a local memory address and a location, in the shared memory, where the output data is already present; and
    increasing, by the device, a reference count associated with the location in the shared memory.

15. The method of claim 14, wherein obtaining the request includes receiving the request from a compute device located at an edge of a network.

16. The method of claim 14, wherein the input data is input data, the output data is first output data, and further including:
    applying the function to second input data to produce second output data; and
    writing, by the device and to the shared memory, after a determination that the second output data is not already present in the shared memory, the second output data to the shared memory.

17. One or more machine-readable storage media comprising a plurality of instructions stored thereon that, in response to being executed, cause a compute device to at least:
    obtain a request to write input data;
    select a function from a plurality of different types of functions based on at least one of a data type of the input data or a type of approximation to be applied to the input data;
    apply the function to the input data to produce output data;
    determine whether the output data is already present in a shared memory;
    write, to a translation table after a determination that the output data is already present in the shared memory, an association between a local memory address and a location, in the shared memory, where the output data is already present; and
    increase a reference count associated with the location in the shared memory.

18. The one or more machine-readable storage media of claim 17, wherein the plurality of instructions further cause the compute device to apply the function in a virtualized environment.

* * * * *